United States Patent
Kesselgruber

(10) Patent No.: US 6,487,487 B2
(45) Date of Patent: Nov. 26, 2002

(54) PROCESS AND APPARATUS FOR DETECTING AND COMPENSATING FOR WHEEL BRAKE IRREGULARITIES

(75) Inventor: Dirk Kesselgruber, Cologne (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/865,493

(22) Filed: May 29, 2001

(65) Prior Publication Data

US 2001/0049577 A1 Dec. 6, 2001

(30) Foreign Application Priority Data

May 26, 2000 (DE) .......................................... 100 26 125

(51) Int. Cl.$^7$ ................................................. G06G 7/76
(52) U.S. Cl. ............................. 701/70; 701/71; 701/76; 701/78; 303/122.05
(58) Field of Search .............................. 701/70, 71, 76, 701/78; 303/122, 122.03, 122.05; 318/362

(56) References Cited

U.S. PATENT DOCUMENTS

| | | | | | |
|---|---|---|---|---|---|
| 5,952,799 A | * | 9/1999 | Maisch et al. | ............... | 318/362 |
| 6,029,108 A | * | 2/2000 | Belschner | ..................... | 701/70 |
| 6,264,011 B1 | * | 7/2001 | Zernickel | ................... | 188/72.8 |

FOREIGN PATENT DOCUMENTS

| | | |
|---|---|---|
| DE | 44 18 768 A1 | 5/1994 |
| DE | 199 36 435 A1 | 7/1999 |
| DE | 19804676 | 8/1999 |

* cited by examiner

*Primary Examiner*—Gertrude Arthur
(74) *Attorney, Agent, or Firm*—Crowell & Moring LLP

(57) ABSTRACT

A method and apparatus for detecting and compensating for wheel brake irregularities includes a unit for detecting a control signal that controls a brake actuator, a unit for detecting changes of the control signal generated by the actuator, and a unit for evaluating control signal changes. The frequency and amplitude of such changes are analyzed to detect the existence of a brake irregularity.

22 Claims, 3 Drawing Sheets

PROCESS AND APPARATUS FOR DETECTING AND COMPENSATING FOR WHEEL BRAKE IRREGULARITIES

BACKGROUND AND SUMMARY OF THE INVENTION

This application claims the priority of German patent document 100 26 125.6, filed May 26, 2000, the disclosure of which is expressly incorporated by reference herein.

The invention concerns a method and apparatus for detecting wheel brake irregularities and for compensating for wheel brake irregularities.

In vehicles, particularly motor vehicles, brake systems are used which preferably feature one wheel brake at each individual wheel. Such a wheel brake can show irregularities, due for example to deformation of the disk of a disk brake in manufacturing or as a result of uneven wear. When operating a wheel brake, such irregularities can lead to brake rubbing which, in turn, can cause not only torsional vibration of the steering wheel and vibration of the car body, but also vibration in the seats and pedal pulsation. Thus, driving comfort is impaired.

One object of the present invention is to provide a method and apparatus for early detection of brake rubbing, preferably before it becomes noticeable to the driver, and to provide a method and apparatus, preferably to be used in combination therewith, that is capable of compensating for irregularities of a wheel brake.

This and other objects and advantages are achieved by the method and apparatus according to the invention, which includes a unit for detecting a control signal which controls a brake actuator, a unit for detecting changes of the control signal generated by the actuator, and a unit for evaluating control signal changes. The invention provides a cost-effective solution for early identification of brake rubbing, particularly in cases where such rubbing evolves into a problem that impairs driving comfort. Furthermore, the invention has the advantage that an identified irregularity can automatically be used to eliminate the irregularity.

The invention provides a cost-effective solution for early identification of brake rubbing, particularly in cases where such rubbing evolves into a problem that impairs driving comfort. Moreover, the invention has the advantage that an identified irregularity is automatically used to eliminate the irregularity.

Other objects, advantages and novel features of the present invention will become apparent from the following detailed description of the invention when considered in conjunction with the accompanying drawings.

DETAILED DESCRIPTION OF THE DRAWINGS

The following paragraphs describe a preferred embodiment of the invention using a hydraulic brake system. The invention can, of course, be used with other brake systems, particularly pneumatic and electrical brake systems.

With a hydraulic brake system, in accordance with the invention, the brake pressure, particularly any changes occurring in the brake pressure, is utilized for detecting irregularities of the wheel brake.

Modern brake control systems use the brake pressure as a control signal, which is already detected by many motor vehicles with the help of sensors. The invention is explained herein by reference to a simple model for the lining/piston/line system of a disk brake as shown in FIG. 1.

Figure 1:
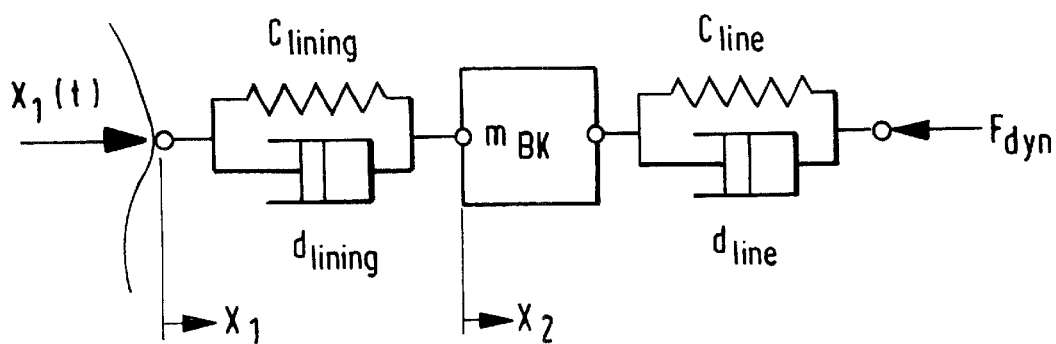
FIG. 1 shows a simple model of the lining/piston/line system of a disk brake.

FIG. 1 shows in particular the effect of disk deformation $x_1$ of a disk brake of an individual wheel on the force $F_{dyn}$ which acts on the measuring unit (wire strain gauge, piezo-electric crystal) in the pressure sensor. In this model, $C_{Lining}$ and $d_{Lining}$ represent compressibility and damping of the brake lining; $m_{BP}$ is the total mass of the brake piston and lining, $C_{Line}$ and $d_{Line}$ describe fluid compressibility as well as rigidity and damping of the brake lines and hoses. To simplify matters, the mechanics of the brake device and the main brake cylinder will be considered rigid, and the operating devices of the brake will be considered fixed. In addition, in this model, the effect of the disk deformations on the other wheel brakes within the brake circuit as well as the dynamic characteristics of the caliper will not be taken into account. Thus, the disk deformation has an immediate effect on the measured brake pressure.

The invention advantageously uses the changes in force $F_{dyn}$, measured in the pressure sensor, for determining the quantity $x_1$, which is a measure of disk deformation. In the ideal case, in which the disk of a disk brake is planar and does not show any deformation, the force $F_{dyn}=0$. In other words, the brake pressure during braking corresponds to the pressure generated by the brake device or the main brake cylinder. In case of irregularity, however, particularly disk deformation of the quantity $x_1$, a periodic variation of the brake pressure corresponding to the turning of the wheel can be noticed. For instance, if only one irregularity exists, the force $F_{dyn}$ will rise and then fall off once during each turn of the wheel. The amplitude of the maximum or minimum force $F_{dyn}$ corresponds to quantity $x_1$; i.e., it is a measure of disk deformation. If two or more disk deformations exist over the perimeter of a disk brake, two or more corresponding maximum and minimum values are found. The individual maximum and minimum values have amplitudes in accordance with the corresponding irregularities. With every turn of the wheel, a periodic variation of force $F_{dyn}$ occurs corresponding to the distribution of the irregularities.

Figure 2:
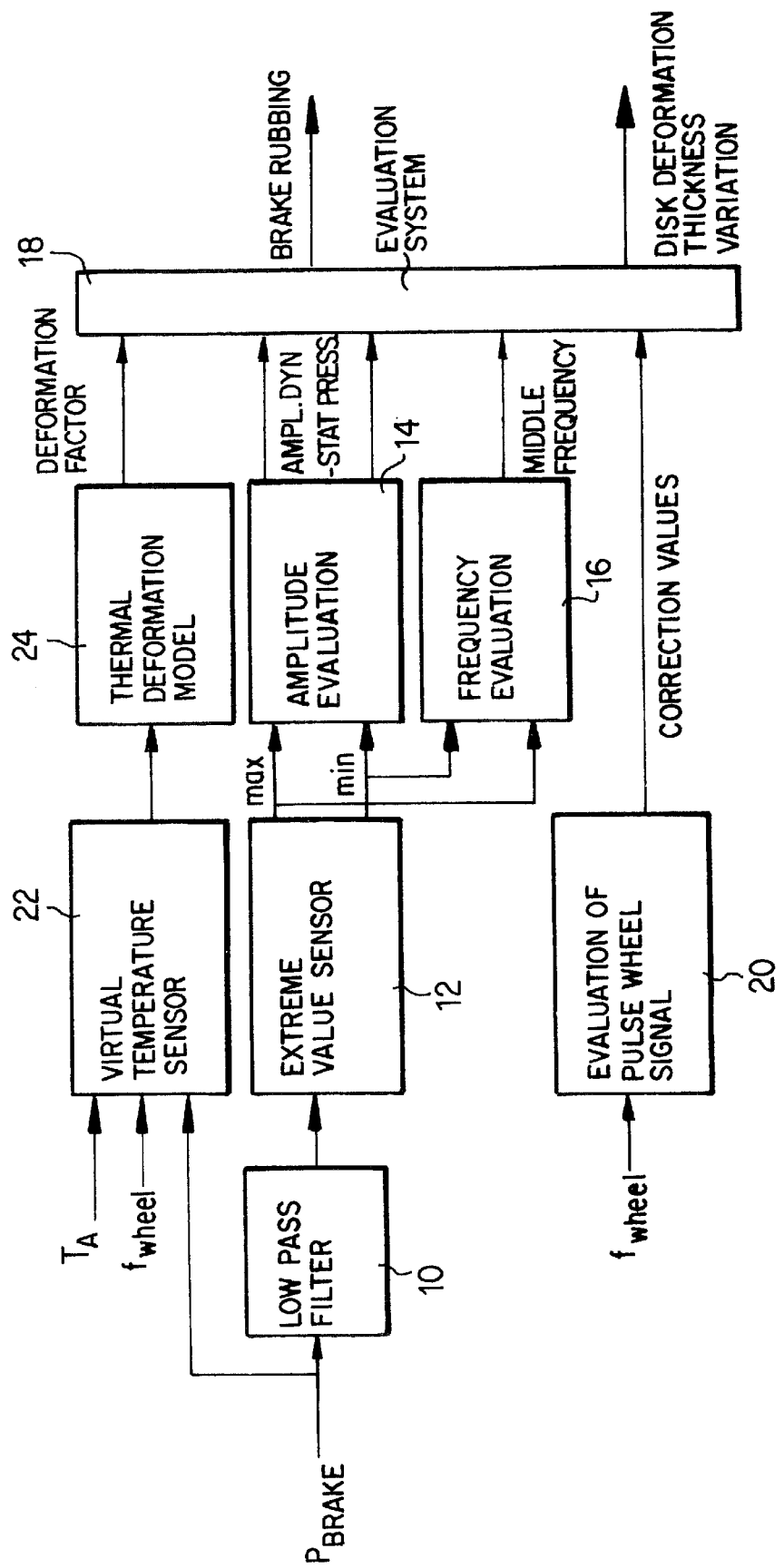
FIG. 2 is a schematic representation of a preferred embodiment detecting irregularities of a wheel brake.

The early rubbing detection system for a hydraulic brake system in accordance with FIG. 2 is based on an amplitude and frequency evaluation of the pressure signal. Rubbing is characterized by a pressure variation that is made up of frequencies which correspond to an integral multiple of the rotary frequency of the wheel. Furthermore, due to braking torque variations, rubbing induces torsional vibration in the wheel.

As represented in FIG. 2, a pressure signal $P_{brake}$ supplied by a measuring unit in the pressure sensor (not shown) is filtered by a low-pass filter (10) and transmitted to a unit for a peak value search (12), which determines the peak value using known procedures such as finding zero crossing of the first derivative of the signal or multi-point comparison procedures. The peak values identified (i.e., minimum and maximum values) are transmitted to a unit for evaluating amplitudes (14) and to a unit for evaluating frequencies (16). The unit for amplitude evaluation supplies an amplitude signal for the dynamic pressure and an amplitude signal for the static pressure. The unit for frequency evaluation (16) supplies a signal, which corresponds substantially to the mean frequency. The above signals are transmitted to an evaluation system (18).

A unit for evaluating the pulse wheel signal (20) receives a signal regarding the rotary frequency of the wheel and determines correction values which are also transmitted to the evaluation system (18). Furthermore, a virtual temperature sensor (22) is provided which receives, as input quantities, brake pressure $P_{brake}$, rotary frequency of the wheel $F_{WHEEL}$ and ambient temperature $T_A$. The virtual temperature sensor supplies a temperature value of the disk brake to a unit (24) which includes a thermal deformation model for the brake disk. This unit emits a deformation factor to the evaluation system (18), which is a measure for the deformation of a brake disk resulting from the heat during braking.

In detail, the system works as follows: The determined peak values (minimum and maximum values) are used to obtain a maximum and a minimum envelope of the pressure signal, by holding the peak values or by interpolating between the peak values. The mean value of the two envelopes corresponds to the static brake pressure. The difference curve of the two envelopes corresponds to the double amplitude of the dynamic pressure portion caused by the disk deformation. The period of the pressure variation, calculated from the time intervals between the determined maximum and minimum values, can be translated into a frequency and compared to the rotary frequencies of the wheel.

If the oscillation amplitude of the pressure exceeds a certain threshold and the pressure frequency matches an integral multiple of the rotary frequency of the wheel (that is, it is within a certain proximity), a warning bit is set.

In the evaluation system (18), a cross comparison with the temperature is performed. Based on the input quantities, brake pressure, rotary frequency of the wheel and ambient temperature, the temperature of the brake disk is continuously estimated by means of a simple temperature model. With the temperature, a thermal deformation factor can be calculated. Using this deformation factor, the amplitude is weighted. Thus, it can be evaluated to what extent the disk is actually deformed or to what extent the deformation has only been made worse by a high temperature that existed momentarily.

In addition, or as an alternative, the evaluation system (18) performs a cross comparison with the ABS tooth pulses. The braking torque variations that occur during rubbing result in rotational vibrations in the wheel which, in turn, can be found in the ABS revolution signal (DE 197 35 313). A cross comparison between pressure evaluation and ABS evaluation can be carried out confirming rubbing. If the pressure evaluation does not give a warning, however, there is probably an unbalanced wheel (if tooth pitch defects have been eliminated).

The evaluation system (18) can be used to perform disk measurement by evaluating the dynamic pressure portion. For mechanical considerations, there is a relation between the degree of disk deformation and the amplitude of the dynamic pressure portion. This allows for measuring of the maximum form defect of the disk, its waviness and/or the thickness variation (in relation to the disk temperature) at the vehicle itself with every braking. Thus, the brake disk can be individually measured for each individual wheel; that is, any existing irregularities distributed over the perimeter can be detected.

Figure 3:
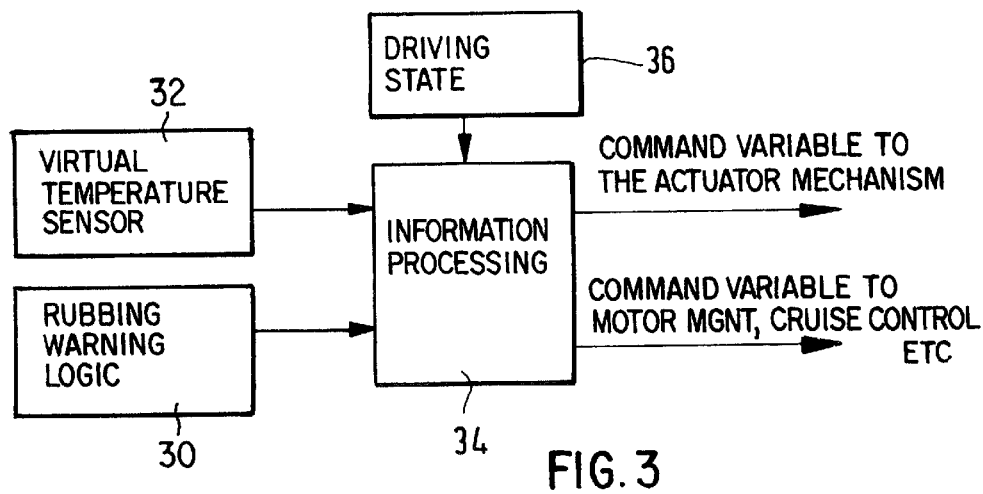
FIG. 3 is a schematic representation of a preferred embodiment compensating for irregularities of a wheel brake.

The present invention also includes a device for disk recovery through active engagement of the brake system. FIG. 3 shows a schematic representation of active disk repair, which consists essentially of a rubbing warning logic (30), a virtual temperature sensor (32), and a unit for determining a driving state (36) which each supply output to an information processing device (34). From the information processing device (34), a command variable is provided to an operating device for brake disk repair (not shown), and preferably further command variables are provided for motor management, cruise control and similar purposes.

As a rubbing warning logic, it is preferred to use a system comparable to the one described with the help of FIG. 2. Preferably, the virtual temperature sensor (32) is identical to the virtual temperature sensor (22) of FIG. 2.

If rubbing is detected with the rubbing warning logic (30), it is possible to apply a small brake pressure, in physically uncritical situations, with an additional smaller brake cylinder which is controlled electrically, pneumatically or hydraulically, and to compensate for brake forces resulting with the drive. Another possibility is to use the engagement possibilities of control system valve units (such as ABS or dynamic stability control, DSC) or to expand their functionality correspondingly. Thus, the vehicle, constantly monitored by the rubbing warning system and the temperature model, would be able to independently "grind" the brake disks "plane" and to counteract rubbing.

The rubbing warning logic (30) monitors the "grinding process." Furthermore, the grinding process is monitored by the virtual temperature sensor (32), which ensures that the grinding process is carried out at low temperatures and that the disk does not get too hot during repair. The information processing device (34) for evaluation of the driving state, particularly for an evaluation of the rotary frequencies of the wheel, the acceleration sensors and, if necessary, the steering angle, indicates whether a driving situation is non-critical for repair, and it stops the grinding process immediately if the process could lead to problematic performance of the vehicle. Furthermore, information is transmitted to motor control, control unit of cruise control, etc. Thus, the occurring braking torque can be compensated for with the drive, and the driver does not notice the disk repair.

Figure 4A:
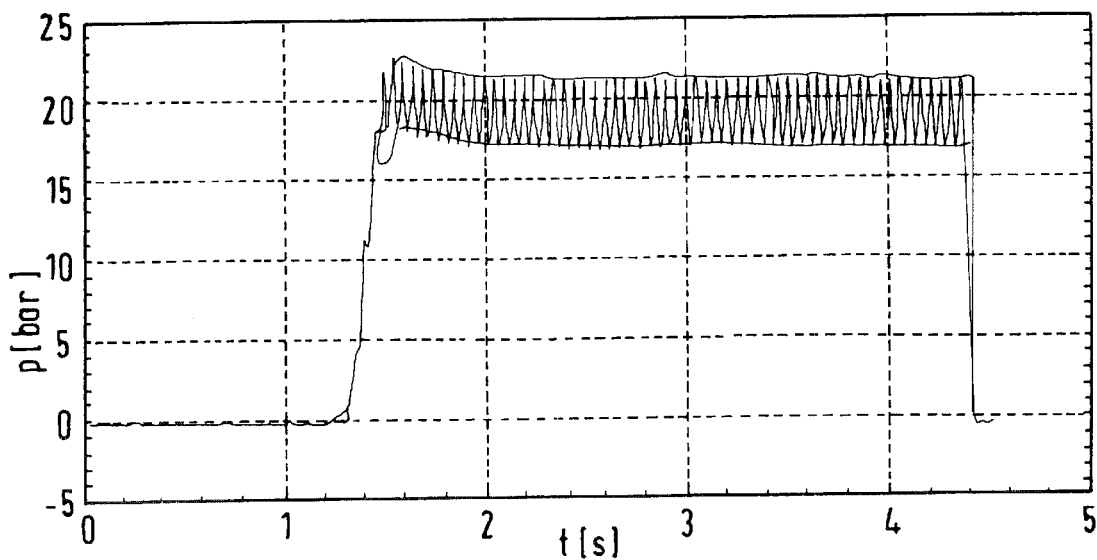
FIGS. 4a–c shows diagrams for explaining the functioning of a rubbing warning system.

Functioning of the rubbing warning system will now be illustrated by means of a schematic examination at an inertia dynamometer using real measurement data. A wheel brake with a significantly deformed brake disk is pressurized with a brake pressure of 20 bar at a constant speed of 20 rps. FIG. 4a shows the low-pass filtered pressure signal. An interpolation procedure between the peak values is used to calculate the envelopes (maximum curve above, minimum curve below).

Figure 4B:
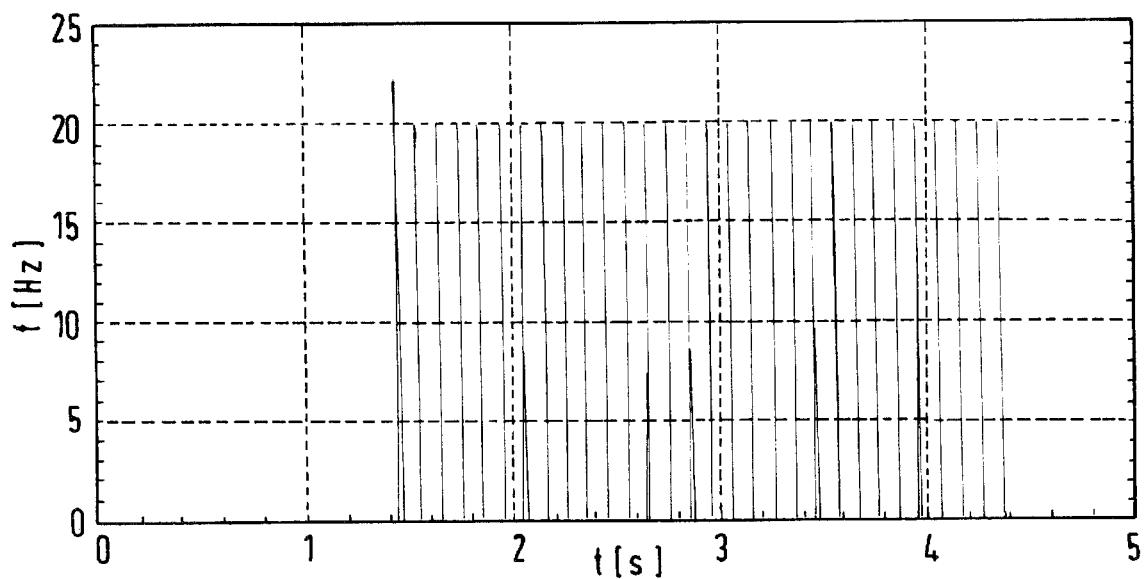
Figure 4C:
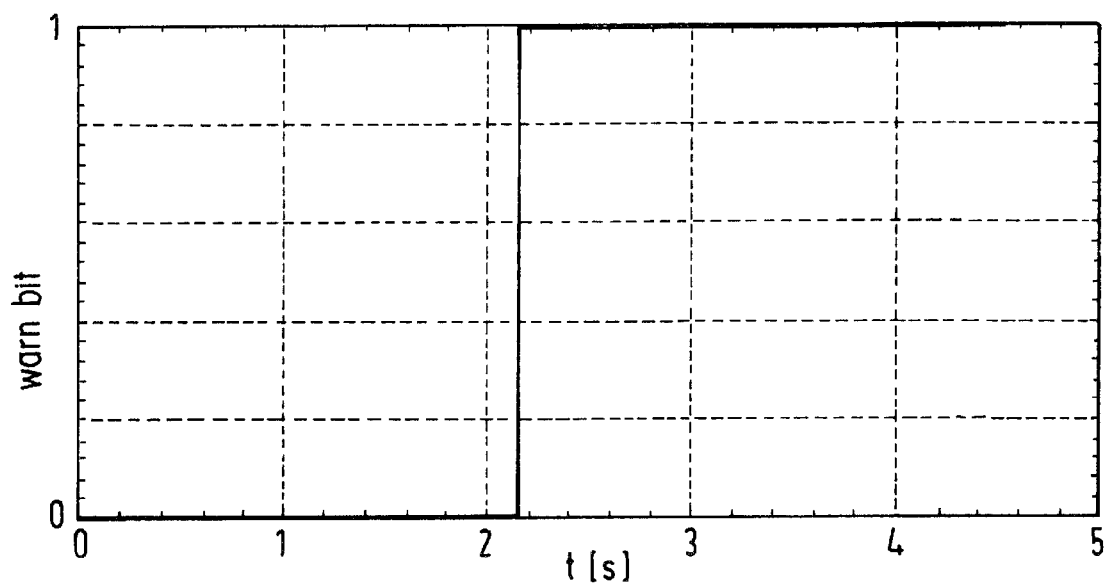

The frequency evaluation shown in FIG. 4b detects the rotary frequency of the wheel very well. If an amplitude value of the dynamic pressure portion above 2 bar is detected, frequency evaluation starts. For each amplitude value exceeding the threshold of 2 bar and for each detected frequency within a certain interval $[f_{Wheel}-1, f_{Wheel}+1]$, a counter is increased by one. If this counter exceeds the value 5, the warning bit is set to one (FIG. 4c).

The examples described above are only intended to illustrate the invention by means of a hydraulic brake system.

With electrical wheel brakes, both the distance sensor to the brake control and the current or voltage fluctuations in the actuator occurring during braking in the event of rubbing can be used. Moreover, using this system with electrical brakes has the advantage that the independent disk repair is very easy to carry out. Via the electrical actuator mechanism, very low normal forces are exerted on the brake lining and can thus be easily controlled.

In accordance with a preferred form of execution of the invention, the system includes the functions rubbing warning, measurement of the brake disk, engagement of the brake system to repair the disk and plausibility possibilities for detecting an unbalanced wheel by evaluating the ABS pulse wheel signals.

In particular, the invention has the advantage that no additional sensors (e.g., force sensors or acceleration sensors) are required for rubbing warning. It can therefore be manufactured cost-efficiently. For instance, a program necessary for controlling the system could be added to the existing control unit for brake control. Then, the invention would cause neither additional material costs nor additional manufacturing costs for series production.

If the rubbing warning system is combined with an actuator mechanism for independent repair of the disk, the vehicle is able to repair the deformed disk (under increased wear) independently. Thus, the customer reduces maintenance costs or even avoids the need to replace the brake disk and the linings.

Disturbances such as torsional vibrations of the steering wheel or vibrations of the car body are prophylactically prevented.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for detecting irregularities of a wheel brake that is controlled via a brake actuator, said device comprising:
    a unit for detecting a control signal for controlling the brake actuator;
    a unit for detecting changes of the control signal, generated by the brake actuator; and
    a unit for evaluating said detected control signal changes.

2. The device according to claim 1, wherein said wheel brake is a vehicle disk brake.

3. The device according to claim 1, wherein the unit for detecting changes of the control signal includes at least one of a filter and a unit for finding peak values.

4. The device according to claim 1, wherein the unit for evaluating changes of the control signal includes at least one of a unit for evaluating amplitude values and a unit for evaluating frequency values.

5. The device according to claim 4, further comprising:
    at least one of a first comparator for comparing control signal changes with a set threshold value, and a second comparator for comparing frequency values with an integral multiple of a rotary frequency of the wheel; and
    a unit connected with the first and second comparator for emitting a warning signal.

6. The device according to claim 1 having a unit for determining maximum and minimum envelopes of the control signal, which envelopes, together, include the control signal changes, whereby a mean value of the two envelopes corresponds to a static control signal and a difference of the maximum and minimum envelopes corresponds to two times a dynamic control signal.

7. The device according to claim 1, further comprising at least one of a unit for detecting temperature of the wheel brake, a unit for detecting rotary frequency of the wheel, and a unit for detecting ambient temperature.

8. The device according to claim 7, wherein the unit for detecting temperature of the wheel brake comprises an estimation device which determines, by means of a temperature model, an estimated temperature of the wheel brake from vehicle parameters, including brake pressure, rotary frequency of the wheel and ambient temperature.

9. The device according to claim 1, further comprising:
    a unit for detecting rotary frequency of the wheel, including ABS pulse wheels for providing ABS rotary frequency signals of the wheel; and
    a unit for comparing the ABS rotary frequency signals of the wheel with signals representing control signal changes.

10. The device according to claim 1, wherein:
    the wheel brake is a hydraulic brake; and
    the control signal is the brake pressure in a hydraulic system measured by a measuring system.

11. The device according to claim 1, wherein:
    the wheel brake is an electrical wheel brake; and
    the control signal is an electrical voltage supplied to an electrical actuator of the wheel brake and measured by a measuring system.

12. The device according to claim 1, wherein:
    the wheel brake comprises a brake disk; and
    changes of the control signal occur as a function of form defects of the brake disk, particularly its waviness or of changes in the thickness of the brake disk.

13. The device according to claim 12, further comprising a unit for detecting the vehicle driving state comprising rotary frequency of the vehicle wheel, acceleration or steering angle of the vehicle, and road conditions, including frictional grip of the wheels.

14. The device according to claim 12, further comprising a unit for controlling the brake system for compensating for the form defects of the disk brake as a function of output signals from the unit for detecting the vehicle driving state, a unit for detecting estimated temperature of the brake disk and the unit for detecting form defects of the brake disk.

15. The device according to claim 1, further comprising a unit for compensating for irregularities of a wheel brake by specific control of the brake actuator for said wheel brake, as a function of a compensating signal.

16. A process for detecting irregularities of a vehicle wheel brake that is controlled via a brake actuator, said process comprising:
    detecting a control signal for controlling the brake actuator;
    detecting changes of the control signal generated by the brake actuator; and
    evaluating control signal changes.

17. A process according to claim 16, wherein the step of evaluating control signal changes comprises evaluating at least one of amplitude and frequency values for said control signal.

18. A processing according to claim 17, further comprising:
    at least one of comparing control signal changes with a set threshold value, and comparing the frequency values with an integral multiple of a rotary frequency of the vehicle wheel; and
    emitting a warning signal as a function of a comparison result.

19. A process according to claim 16, further comprising:

determining maximum and minimum envelopes of the control signal;

deriving a difference value of the envelopes, corresponding to two times a dynamic control signal.

20. A vehicle braking system, comprising:

a wheel brake actuated by a brake actuator;

a unit for detecting a control signal for controlling the brake actuator;

a unit for detecting changes of the control signal, generated by the brake actuator; and a unit for evaluating irregularities of the wheel brake, based on detected changes in the control signal.

21. A device for detecting irregularities of a wheel brake that is controlled via a brake actuator, said device comprising:

a unit for detecting a control signal for controlling the brake actuator;

a unit for detecting changes of the control signal generated by the brake actuator; and a unit for evaluating irregularities of the wheel brake, based on detected changes in the control signal.

22. A method for detecting irregularities of a wheel brake in a vehicle having a brake actuator for actuating the wheel brake, said method comprising:

detecting a control signal for controlling the brake actuator;

detecting changes of the control signal, generated by the brake actuator; and evaluating irregularities of the wheel brake, based on detected changes in the control signal.

* * * * *